United States Patent
Inoubli et al.

(10) Patent No.: US 10,968,341 B2
(45) Date of Patent: *Apr. 6, 2021

(54) LIQUID COMPOSITION COMPRISING A MULTISTAGE POLYMER, ITS METHOD OF PREPARATION AND ITS USE

(71) Applicant: Arkema France, Colombes (FR)

(72) Inventors: Raber Inoubli, Villeurbanne (FR); Philippe Hajji, Chatillon d'Azergues (FR); Rosangela Pirri, Montardon (FR)

(73) Assignee: Arkema France, Colombes (FR)

( * ) Notice: Subject to any disclaimer, the term of this patent is extended or adjusted under 35 U.S.C. 154(b) by 150 days.

This patent is subject to a terminal disclaimer.

(21) Appl. No.: 16/068,954

(22) PCT Filed: Jan. 11, 2017

(86) PCT No.: PCT/EP2017/050460
§ 371 (c)(1),
(2) Date: Jul. 10, 2018

(87) PCT Pub. No.: WO2017/121749
PCT Pub. Date: Jul. 20, 2017

(65) Prior Publication Data
US 2019/0023890 A1 Jan. 24, 2019

(30) Foreign Application Priority Data

Jan. 11, 2016 (FR) ...................................... 1650191

(51) Int. Cl.
*C08L 33/12* (2006.01)
*C08F 285/00* (2006.01)
*C08F 265/06* (2006.01)

(52) U.S. Cl.
CPC ............ *C08L 33/12* (2013.01); *C08F 265/06* (2013.01); *C08F 285/00* (2013.01)

(58) Field of Classification Search
CPC .............................. C08L 2207/53; C08L 33/12
See application file for complete search history.

(56) References Cited

U.S. PATENT DOCUMENTS

| | | | |
|---|---|---|---|
| 3,793,402 A * | 2/1974 | Owens | C08L 33/20 525/81 |
| 5,286,801 A * | 2/1994 | Besecke | C08F 285/00 525/307 |
| 6,087,449 A * | 7/2000 | Tiefensee | C08L 25/12 525/228 |
| 6,331,580 B1 | 12/2001 | Molnar | |
| 2005/0085607 A1 * | 4/2005 | Kabs | C08F 220/14 526/317.1 |
| 2011/0034612 A1 | 2/2011 | Lyons et al. | |
| 2013/0281629 A1 | 10/2013 | Pirri et al. | |
| 2014/0364541 A1 | 12/2014 | Lyons et al. | |
| 2015/0218362 A1 | 8/2015 | Gerard et al. | |
| 2015/0218369 A1 | 8/2015 | Okamoto et al. | |
| 2015/0376437 A1 * | 12/2015 | Hoess | C08F 285/00 524/379 |
| 2016/0009878 A1 | 1/2016 | Gerard | |
| 2016/0017138 A1 * | 1/2016 | Gerard | C08J 5/24 525/94 |

FOREIGN PATENT DOCUMENTS

| | | | |
|---|---|---|---|
| EP | 0 985 692 B1 | 1/2005 | |
| GB | 2039496 * | 8/1980 | |
| JP | H0911085 A | 1/1997 | |
| JP | H09110496 A | 4/1997 | |
| JP | H09110497 A | 4/1997 | |
| JP | H09111084 A | 4/1997 | |
| JP | H09111086 A | 4/1997 | |
| WO | WO 2014/013028 A1 | 1/2014 | |
| WO | WO-2014135815 A1 * | 9/2014 | .......... D06M 13/203 |
| WO | WO-2014154543 A1 * | 10/2014 | .......... C09D 133/08 |

* cited by examiner

*Primary Examiner* — Robert C Boyle
(74) *Attorney, Agent, or Firm* — Lynn B. Morreale

(57) ABSTRACT

The present invention relates to a liquid composition comprising a monomer, a (meth)acrylic polymer and a multistage polymer. In particular the present invention it relates to liquid composition comprising a monomer, a (meth)acrylic polymer and a multistage polymer that can be used as a syrup. More particularly the present invention relates also to a process for preparing a liquid composition comprising a monomer, a (meth)acrylic polymer and a multistage polymer.

5 Claims, No Drawings

LIQUID COMPOSITION COMPRISING A MULTISTAGE POLYMER, ITS METHOD OF PREPARATION AND ITS USE

CROSS-REFERENCE TO RELATED APPLICATIONS

This application is a national stage application under 35 U.S.C. § 371 of PCT/EP2017/050460, filed Jan. 11, 2017 which claims benefit to application FR16.50191, filed Jan. 11, 2016.

FIELD OF THE INVENTION

The present invention relates to a liquid composition comprising a monomer, a (meth)acrylic polymer and a multistage polymer.

In particular the present invention it relates to liquid composition comprising a monomer, a (meth)acrylic polymer and a multistage polymer that can be used as a syrup.

More particularly the present invention relates also to a process for preparing a liquid composition comprising a monomer, a (meth)acrylic polymer and a multistage polymer.

Technical Problem

Impact modifiers are widely used to improve the impact strength for polymeric compositions with the aim to compensate their inherent brittleness or the embrittlement that occurs at ambient temperature but also and especially at sub zero temperatures, notch sensitivity and crack propagation. So an impact modified polymer is a polymeric material whose impact resistance and toughness have been increased by the incorporation of phase micro domains of a rubbery material.

This is usually done due to the introduction of microscopic rubber particles into the polymer matrix that can absorb the energy of an impact or dissipate it. One possibility is to introduce the rubber particles in form of core-shell particles. These core-shell particles that possess very generally a rubber core and a polymeric shell, having the advantage of a proper particle size of the rubber core for effective toughening and the grafted shell in order to have the adhesion and compatibility with the thermoplastic matrix.

The performance of the impact modification is a function of the particles size, especially of the rubber part of the particle, and its quantity. There is an optimal average particle size in order to have the highest impact strength for a given quantity of added impact modifier particles.

These primary impact modifier particles are usually added in form of powder particles to the polymeric material. These powder particles are agglomerated primary impact modifier particles. During the blending of the thermoplastic material with the powder particles the primary impact modifier particles are regained and are dispersed more or less homogenously dispersed in the thermoplastic material.

While the particle size of the impact modifier particles in the range of nanometers, the range of the agglomerated powder particles is in the range of micrometers. Latter is much easier for handling.

For many polymers, thermoplastic or thermoset polymers it is very difficult or nearly impossible to disperse correctly these multistage polymer in form of core shell particles as agglomerated dry powders. An ideal homogenous dispersion of the core-shell particle has no agglomerates after the dispersed in the matrix.

The objective of the present invention is to obtain liquid composition comprising a monomer, a (meth)acrylic polymer and a multistage polymer, with a homogenous dispersion of the multistage polymer.

An objective of the present invention is also to have a liquid composition comprising a monomer, a (meth)acrylic polymer and a multistage polymer, with a homogenous dispersion of the multistage polymer, that can be used in a polymerization.

Another objective of the present invention is to avoid or reduce significantly the agglomeration of multistage polymer.

Still an additional objective is having a process for preparing a liquid composition comprising a monomer, a (meth)acrylic polymer and a multistage polymer, with a homogenous dispersion of the multistage polymer.

Still a further objective is the use of the composition comprising a monomer, a (meth)acrylic polymer for the impact modification of polymers.

[BACKGROUND OF THE INVENTION] PRIOR ART

The document WO2014/013028 discloses an impregnation process for a fibrous substrate, a liquid (meth) acrylic syrup for the impregnation process, its method of polymerization and structured article obtained thereof. The syrup comprises a (meth)acrylic monomer, a (meth)acrylic polymer and optionally impact modifier in the form of fine particles.

The document WO2014/135815 discloses a viscous liquid (meth)acrylic syrup mainly containing methacrylic or acrylic components and an impact-modifying additive for reinforcing the impact strength of a thermoplastic material obtained after polymerization of the syrup. The impact-modifying additive is based on elastomeric domains consisting of macromolecular blocks of flexible nature. A multi stage polymer especially in form of core/shell particles is not disclosed.

The document WO2014/135816 discloses a viscous liquid (meth)acrylic syrup mainly containing methacrylic or acrylic components and organic or mineral fillers intended to reduce the proportion of residual monomer after polymerization of the (meth)acrylic syrup. The organic filler is chosen from crosslinked PMMA beads. A multi stage polymer especially in form of core/shell particles is not disclosed.

The document EP0985692 discloses improved MBS impact modifier. The MBS impact modifier is a multistage polymer in form of a core/shell polymer and its process of preparation by emulsion polymerization.

None of the prior art document(s) discloses a composition as claimed or a process for obtaining it.

BRIEF DESCRIPTION OF THE INVENTION

Surprisingly it has been found that a liquid composition comprising
  a) a (meth)acrylic polymer (P1),
  b) a multi stage polymer and
  c) a monomer (M1)
wherein the multistage polymer to monomer (M1) ratio by weight in the liquid composition is between 1/99 and 25/75, is less viscous than a composition not comprising the (meth)acrylic polymer (P1).

Surprisingly it has also been found that a liquid composition comprising
 a) a (meth)acrylic polymer (P1),
 b) a multi stage polymer and
 c) a monomer (M1)
wherein the multistage polymer to monomer (M1) ratio by weight in the liquid composition is between 1/99 and 25/75, possesses a better dispersion of the multistage polymer than a composition not comprising the (meth)acrylic polymer (P1).

Surprisingly it has also been found that a liquid composition comprising
 a) a (meth)acrylic polymer (P1),
 b) a multi stage polymer and
 c) a monomer (M1)
wherein the multistage polymer to monomer (M1) ratio by weight in the liquid composition is between 1/99 and 25/75, can be used to prepare a better dispersion of the multistage polymer in the monomer (M1) than a composition not comprising the (meth)acrylic polymer (P1).

Surprisingly it has also been found that a process for manufacturing a liquid composition comprising the steps of
 a) preparing a composition comprising a the (meth) acrylic polymer (P1) and a multi stage polymer
 b) mixing the composition of previous step with a monomer (M1)
wherein the multistage polymer to monomer (M1) ratio by weight in the liquid composition is between 1/99 and 25/75, yields to a liquid composition that is less viscous than a composition not comprising the (meth)acrylic polymer (P1).

Surprisingly it has also been found that a liquid composition comprising
 a) a (meth)acrylic polymer (P1),
 b) a multi stage polymer and
 c) a monomer (M1)
wherein the multistage polymer to monomer ratio by weight in the liquid composition is between 1/99 and 25/75, can be used for the preparation of the impact modified polymers.

DETAILED DESCRIPTION OF THE INVENTION

According to a first aspect, the present invention relates to aa liquid composition comprising
 a) a (meth)acrylic polymer (P1),
 b) a multi stage polymer and
 c) a monomer (M1)
wherein the multistage polymer to monomer ratio by weight in the liquid composition is between 1/99 and 25/75.

According to a second aspect, the present invention relates to a process for manufacturing a liquid composition comprising the steps of
 a) preparing a composition comprising a the (meth) acrylic polymer (P1) and a multi stage polymer
 b) mixing the composition of previous step with a monomer (M1)
wherein the multistage polymer to monomer ratio by weight in the liquid composition is between 1/99 and 25/75.

In a third aspect the present invention relates to the use a liquid composition comprising
 a) a (meth)acrylic polymer (P1),
 b) a multi stage polymer and
 c) a monomer (M1)
wherein the multistage polymer to monomer ratio by weight in the liquid composition is between 1/99 and 25/75, for the impact modification of polymers.

By the term "polymer powder" as used is denoted a polymer comprising powder grain in the range of at least 1 micrometer (µm) obtained by agglomeration of primary polymer comprising particles in the nanometer range.

By the term "primary particle" as used is denoted a spherical polymer comprising particle in the nanometer range. Preferably the primary particle has a weight average particle size between 20 nm and 800 nm.

By the term "particle size" as used is denoted the volume average diameter of a particle considered as spherical.

By the term "copolymer" as used is denoted that the polymer consists of at least two different monomers.

By "multistage polymer" as used is denoted a polymer formed in sequential fashion by a multi-stage polymerization process. One preferred process is a multi-stage emulsion polymerization process in which the first polymer is a first-stage polymer and the second polymer is a second-stage polymer, i.e., the second polymer is formed by emulsion polymerization in the presence of the first emulsion polymer.

By the term "(meth) acrylic" as used is denoted all kind of acrylic and methacrylic monomers.

By the term "(meth)acrylic polymer" as used is denoted that the (meth)acrylic) polymer comprises essentially polymers comprising (meth)acrylic monomers that make up 50 wt % or more of the (meth)acrylic polymer.

By the term "epoxy resin" as used is understood any organic compound having at least two functional groups of oxirane type which can be polymerized by ring opening.

By the term "(meth)acrylic resin" as used is understood adhesives based on acrylic and methacrylic monomers.

By the term "masterbatch" as used is understood composition that comprises an additive in high concentration in a carrier material. The additive is dispersed in the carrier material.

By the term "impact modifier" as used is understood a material that once incorporated in a polymeric material increases the impact resistance and toughness of that polymeric material by phase micro domains of a rubbery material or rubber polymer.

By the term "rubber" as used is denoted to the thermodynamic state of the polymer above its glass transition.

By the term "rubber polymer" as used is denoted a polymer that has a glass transition temperature (Tg) below 0° C.

The liquid composition of the invention comprises at least three components a) a (meth)acrylic polymer (P1), b) a multi stage polymer, c) a (meth)acrylic monomer (M1), wherein the multistage polymer to monomer ratio by weight in the liquid composition is between 1/99 and 25/75, in the liquid composition comprising the three compounds.

Preferably the multistage polymer to monomer (M1) ratio by weight in the liquid composition is between 2/98 and 24/76, more preferably between 3/97 and 23/77, still more preferably between 4/96 and 22/78 and advantageously between 5/95 and 20/80.

The dynamic viscosity of the liquid composition according to the invention is in a range from 10 mPa*s to 1 000 000 mPa*s, preferably from 10 mPa*s to 500 000 mPa*s and advantageously from 50 mPa*s to 300 000 mPa*s. The viscosity of the liquid composition (sometimes also called syrup) can be easily measured with a Rheometer with a shear force between 0.1 s-1 and 100 s-1. The dynamic viscosity is measured at 25° C. If there is a shear thinning the viscosity is measured at a shear force of 1 s-1.

With regard to the (meth)acrylic polymer (P1), it has a mass average molecular weight Mw of less than 100 000 g/mol, preferably less than 90 000 g/mol, more preferably less than 80 000 g/mol, still more preferably less than 70 000 g/mol, advantageously less than 60 000 g/mol, more advantageously less than 50 000 g/mol and still more advantageously less than 40 000 g/mol.

The (meth)acrylic polymer (P1), it has a mass average molecular weight Mw above 2 000 g/mol, preferably above 3000 g/mol, more preferably above 4000 g/mol, still more preferably above 5 000 g/mol, advantageously above 6 000 g/mol, more advantageously above 6 500 g/mol and still more advantageously above 7 000 g/mol and most advantageously above 10 000 g/mol.

The mass average molecular weight Mw of (meth)acrylic polymer (P1) is between 2 000 g/mol and 100 000 g/mol, preferable between 3 000 g/mol and 90 000 g/mol and more preferably between 4 000 g/mol and 80 000 g/mol advantageously between 5000 g/mol and 70 000 g/mol, more advantageously between 6 000 g/mol and 50 000 g/mol and most advantageously between 10 000 g/mol and 40 000 g/mol.

Preferably the (meth)acrylic polymer (P1) is a copolymer comprising (meth)acrylic monomers. More preferably the (meth)acrylic polymer (P1) is a (meth) acrylic polymer. Still more preferably the (meth)acrylic polymer (P1) comprises at least 50 wt % monomers chosen from C1 to C12 alkyl (meth)acrylates. Advantageously preferably the (meth) acrylic polymer (P1) comprises at least 50 wt % of monomers chosen from C1 to C4 alkyl methacrylate and C1 to C8 alkyl acrylate monomers and mixtures thereof.

Preferably the glass transition temperature Tg of the (meth)acrylic polymer (P1) is between 30° C. and 150° C. The glass transition temperature of the (meth)acrylic polymer (P1) is more preferably between 40° C. and 150° C., advantageously between 45° C. and 150° C. and more advantageously between 50° C. and 150° C.

Preferably the polymer (meth)acrylic polymer (P1) is not crosslinked.

Preferably the polymer (meth)acrylic polymer (P1) is not grafted on any other polymer or polymers.

In a first preferred embodiment the (meth)acrylic polymer (P1) comprises from 50 wt % to 100 wt % methyl methacrylate, preferably from 80 wt % to 100 wt % methyl methacrylate, still more preferably from 80 wt % to 99.8 wt % methyl methacrylate and from 0.2 wt % to 20 wt % of an C1 to C8 alkyl acrylate monomer. Advantageously the C1 to C8 alkyl acrylate monomer is chosen from methyl acrylate, ethyl acrylate or butyl acrylate.

In a second preferred embodiment the (meth)acrylic polymer (P1) comprises between 0 wt % and 50 wt % of a functional monomer. Preferably the (meth)acrylic polymer (P1) comprises between 0 wt % and 30 wt % of the functional monomer, more preferably between 1 wt % and 30 wt %, still more preferably between 2 wt % and 30 wt %, advantageously between 3 wt % and 30 wt %, more advantageously between 5 wt % and 30 wt % and most advantageously between 5 wt % and 30 wt %.

Preferably the functional monomer of the second preferred embodiment is a (meth)acrylic monomer. The functional monomer has the formula (1) or (2):

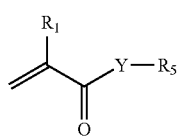

(1)

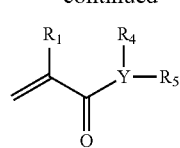

(2)

wherein in both formulas (1) and (2) $R_1$ is chosen from H or $CH_3$; and in formula (1) Y is O, $R_5$ is H or an aliphatic or aromatic radical having at least one atom that is not C or H; and in formula (2) Y is N and $R_4$ and/or $R_3$ is H or an aliphatic or aromatic radical.

Preferably the functional monomer (1) or (2) is chosen from glycidyl (meth)acrylate, acrylic or methacrylic acid, the amides derived from these acids, such as, for example, dimethylacrylamide, 2-methoxyethyl acrylate or methacrylate, 2-aminoethyl acrylates or methacrylates are optionally quaternized, acrylate or methacrylate monomers comprising a phosphonate or phosphate group, alkyl imidazolidinone (meth) acrylates, polyethylene glycol (meth) acrylates. Preferably the polyethylene glycol group of polyethylene glycol (meth) acrylates has a molecular weight ranging from 400 g/mol to 10 000 g/mol The multistage polymer according to the invention has at least two stages that are different in its polymer composition.

The multistage polymer is preferably in form of polymer particles considered as spherical particles. These particles are also called core shell particles. The first stage forms the core, the second or all following stages the respective shells. Such a multistage polymer which is also called core/shell particle is preferred.

With regard to the polymeric particle according to the invention, which is the primary particle, it has a weight average particle size between 15 nm and 900 nm. Preferably the weight average particle size (diameter) of the polymer is between 20 nm and 800 nm, more preferably between, more preferably between 25 nm and 600 nm, still more preferably between 30 nm and 550 nm, again still more preferably between 35 nm and 500 nm, advantageously between 40 nm and 400 nm, even more advantageously between 75 nm and 350 nm and advantageously between 80 nm and 300 nm. The primary polymer particles can be agglomerated giving a polymer powder comprising either the multi stage polymer or the (meth) acrylic polymer (P1) and the multi stage polymer.

The polymer particle is obtained by a multistage process such as a process comprising two, three or more stages.

The polymer particle has a multilayer structure comprising at least one layer (A) comprising a polymer (A1) having a glass transition temperature below 0° C. and another layer (B) comprising a polymer (B1) having a glass transition temperature over 30° C.

In a first preferred embodiment the polymer (B1) having a glass transition temperature of at least 30° C. is the external layer of the polymer particle having the multilayer structure.

In a second preferred embodiment the polymer (B1) having a glass transition temperature of at least 30° C. is an intermediate layer of the polymer particle having the multilayer structure, before the multistage polymer is brought into contact with the monomer (M1).

Preferably the stage (A) is the first stage and the stage (B) comprising polymer (B1) is grafted on stage (A) comprising polymer (A1) or another intermediate layer. By first stage is meant that the stage (A) comprising polymer (A1) is made before the stage (B) comprising polymer (B1).

The polymer (A1) having a glass transition temperature below 0° C. in the layer (A) is never made during the last stage of the multistage process. This means that the polymer (A1) is never in the external layer of the particle with the multilayer structure. The polymer (A1) having a glass transition temperature below 0° C. in the layer (A) is either in the core of the polymer particle or one of the inner layers.

Preferably the polymer (A1) having a glass transition temperature below 0° C. in the layer (A) is made in the first stage of the multistage process forming the core for the polymer particle having the multilayer structure and/or before the polymer (B1) having a glass transition temperature over 60° C. Preferably the polymer (A1) is having a glass transition temperature below −5° C., more preferably below −15° C., advantageously below −25° C.

In a first preferred embodiment the polymer (B1) having a glass transition temperature over 60° C. is made in the last stage of the multistage process forming the external layer of the polymer particle having the multilayer structure.

In a second preferred embodiment the polymer (B1) having a glass transition temperature of at least 30° C. is an intermediate layer of the polymer particle having the multilayer structure, is made in a stage after the stage for forming the polymer (A1) of the multistage process.

There could be additional intermediate layer or layers obtained by an intermediate stage or intermediate stages.

The glass transition temperature Tg of the respective polymers can be estimated for example by dynamic methods as thermo mechanical analysis.

In order to obtain a sample of the respective polymers (A1) and (B1) they can be prepared alone, and not by a multistage process, for estimating and measuring more easily the glass transition temperature Tg individually of the respective polymers of the respective stages.

With regard to the polymer (A1), in a first embodiment it is a (meth) acrylic polymer comprising at least 50 wt % of monomers from alkyl acrylates.

More preferably the polymer (A1) comprises a comonomer or comonomers which are copolymerizable with alkyl acrylate, as long as polymer (A1) is having a glass transition temperature of less than 0° C.

The comonomer or comonomers in polymer (A1) are preferably chosen from (meth)acrylic monomers and/or vinyl monomers.

The (meth)acrylic comonomer in polymer (A1) comprises monomers chosen from C1 to C12 alkyl (meth)acrylates. Still more preferably (meth)acrylic comonomer in polymer (A1) comprises monomers of C1 to C4 alkyl methacrylate and/or C1 to C8 alkyl acrylate monomers.

Most preferably the acrylic or methacrylic comonomers of the polymer (A1) are chosen from methyl acrylate, propyl acrylate, isopropyl acrylate, butyl acrylate, tert-butyl acrylate, methyl methacrylate, ethyl methacrylate, butyl methacrylate and mixtures thereof, as long as polymer (A1) is having a glass transition temperature of less than 0° C.

Preferably the polymer (A1) is crosslinked. This means that a crosslinker is added to the other monomer or monomers. A crosslinker comprises at least two groups that can be polymerized.

In one specific embodiment polymer (A1) is a homopolymer of butyl acrylate.

In another specific embodiment polymer (A1) is a copolymer of butyl acrylate and at least one crosslinker. The crosslinker presents less than 5 wt % of this copolymer.

More preferably the glass transition temperature Tg of the polymer (A1) of the first embodiment is between −100° C. and 0° C., even more preferably between −100° C. and −5° C., advantageously between −90° C. and −15° C. and more advantageously between −90° C. and −25° C.

With regard to the polymer (A1), in a second embodiment the polymer (A1) is a silicone rubber based polymer. The silicone rubber for example is polydimethyl siloxane. More preferably the glass transition temperature Tg of the polymer (A1) of the second embodiment is between −150° C. and 0° C., even more preferably between −145° C. and −5° C., advantageously between −140° C. and −15° C. and more advantageously between −135° C. and −25° C.

With regard to the polymer (A1), in a third embodiment the polymer (A1) having a glass transition temperature below 0° C. comprises at least 50 wt % of polymeric units coming from isoprene or butadiene and the stage (A) is the most inner layer of the polymer particle having the multilayer structure. In other words the stage (A) comprising the polymer (A1) is the core of the polymer particle.

By way of example, the polymer (A1) of the core of the second embodiment, mention may be made of isoprene homopolymers or butadiene homopolymers, isoprene-butadiene copolymers, copolymers of isoprene with at most 98 wt % of a vinyl monomer and copolymers of butadiene with at most 98 wt % of a vinyl monomer. The vinyl monomer may be styrene, an alkylstyrene, acrylonitrile, an alkyl (meth)acrylate, or butadiene or isoprene. In one embodiment the core is a butadiene homopolymer.

More preferably the glass transition temperature Tg of the polymer (A1) of the third embodiment comprising at least 50 wt % of polymeric units coming from isoprene or butadiene is between −100° C. and 0° C., even more preferably between −100° C. and −5° C., advantageously between −90° C. and −15° C. and even more advantageously between −90° C. and −25° C.

With regard to the polymer (B1), mention may be made of homopolymers and copolymers comprising monomers with double bonds and/or vinyl monomers. Preferably the polymer (B1) is a (meth) acrylic polymer.

Preferably the polymer (B1) comprises at least 70 wt % monomers chosen from C1 to C12 alkyl (meth)acrylates. Still more preferably the polymer (B1) comprises at least 80 wt % of monomers C1 to C4 alkyl methacrylate and/or C1 to C8 alkyl acrylate monomers.

The polymer (B1) can be crosslinked.

Most preferably the acrylic or methacrylic monomers of the polymer (B1) are chosen from methyl acrylate, ethyl acrylate, butyl acrylate, methyl methacrylate, ethyl methacrylate, butyl methacrylate and mixtures thereof, as long as polymer (B1) is having a glass transition temperature of at least 30° C.

Advantageously the polymer (B1) comprises at least 50 wt %, more advantageously at least 60 wt % and even more advantageously at least 70 wt % of monomer units coming from methyl methacrylate.

Preferably the glass transition temperature Tg of the polymer (B1) is between 30° C. and 150° C. The glass transition temperature of the polymer (B1) is more preferably between 50° C. and 150° C., still more preferably between 70° C. and 150° C., advantageously between 90° C. and 150° C. and more advantageously between 90° C. and 130° C.

In another embodiment the multi stage polymer as described previously, has an additional stage, which is the (meth)acrylic polymer (P1). The primary polymer particle according to this embodiment of the invention has a multi-layer structure comprising at least one stage (A) comprising a polymer (A1) having a glass transition temperature below 0° C., at least one stage (B) comprising a polymer (B1)

having a glass transition temperature over 30° C. and at least one stage (P) comprising the (meth)acrylic polymer (P1) having a glass transition temperature between 30° C. and 150° C.

Preferably the (meth)acrylic polymer (P1) is not grafted on any of the polymers (A1) or (B1).

With regard to the process for manufacturing the multistage polymer according to the invention it comprises the steps of
- a) polymerizing by emulsion polymerization of a monomer or monomer mixture ($A_m$) to obtain at least one layer (A) comprising polymer (A1) having a glass transition temperature of less than 0° C.
- b) polymerizing by emulsion polymerization of a monomer or monomer mixture ($B_m$) to obtain layer (B) comprising a polymer (B1) having a glass transition temperature of at least 30° C.

the monomer or monomer mixture ($A_m$) and the monomer or monomer mixture ($B_m$) are chosen from monomers according to the composition for polymer (A1) and polymer (B1) given earlier.

Preferably the step a) is made before step b). More preferably step b) is performed in presence of the polymer (A1) obtained in step a), if there are only two stages.

Advantageously the process for manufacturing the multistage polymer composition according to the invention is a multistep process comprises the steps one after the other of
- a) polymerizing by emulsion polymerization of a monomer or monomer mixture ($A_m$) to obtain one layer (A) comprising polymer (A1) having a glass transition temperature of less than 0° C.
- b) polymerizing by emulsion polymerization of a monomer or monomer mixture ($B_m$) to obtain layer (B) comprising a polymer (B1) having a glass transition temperature of at least 30° C.

The respective monomers or monomer mixtures ($A_m$) and ($B_m$) for forming the layers (A) and (B) respectively comprising the polymers (A1) and (B1) respectively and the characteristics of the respective polymers (A1) and (B1) are the same as defined before.

The process for manufacturing the multistage polymer can comprise additional steps for additional stages between the steps a) and b).

The process for manufacturing the multistage polymer can also comprise additional steps for additional stages before the steps a) and b). A seed could be used for polymerizing by emulsion polymerization the monomer or monomers mixture ($A_m$) to obtain the layer (A) comprising polymer (A1) having a glass transition temperature of less than 0° C. The seed is preferably a thermoplastic polymer having a glass transition temperature of at least 20° C.

The multistage polymer is obtained as an aqueous dispersion of the polymer particles. The solid content of the dispersion is between 10 wt % and 65 wt %.

With regard to the process for manufacturing the (meth) acrylic polymer (P1) according to the invention is comprises the step of polymerizing the respective (meth)acrylic monomers ($P1_m$). The respective (meth)acrylic monomers ($P1_m$) are the same as defined before for the (meth)acrylic polymer (P1) and two preferred embodiments the (meth)acrylic polymer (P1).

The (meth)acrylic homo or copolymer (P1) could be made in batch or semi-continuous process:
- for the batch process, the mixture of monomers is introduced in one shot just before or after introduction of one or part of the initiator system
- for the semi-continuous process, the monomer mixture is added in multiple shots or continuously in parallel to the initiator addition (the initiator is also added in multiple shots or continuously) during a defined period of addition which could be in the range 30 to 500 min.

The process for preparing the polymer composition comprising the (meth) acrylic polymer (P1) and the multi stage polymer has two preferred embodiments.

In a first preferred embodiment of the process, the (meth) acrylic polymer (P1) is polymerized in the presence of the multistage polymer. The (meth) acrylic polymer (P1) is made as an additional stage of the multistage polymer.

In a second preferred embodiment of the process, the (meth) acrylic polymer (P1) is polymerized apart and mixed or blended with the multistage polymer.

With regard to the process according to the first preferred embodiment for preparing the polymer composition comprising the (meth) acrylic polymer (P1) and the multi stage polymer, it comprises the steps of
- a) polymerizing by emulsion polymerization of a monomer or monomer mixture ($A_m$) to obtain one layer in stage (A) comprising polymer (A1) having a glass transition temperature of less than 0° C.
- b) polymerizing by emulsion polymerization of a monomer or monomer mixture ($B_m$) to obtain layer in stage (B) comprising a polymer (B1) having a glass transition temperature of at least 30° C.
- c) polymerizing by emulsion polymerization of a monomer or monomer mixture ($P1_m$) to obtain a layer in this additional stage comprising the (meth) acrylic polymer (P1) having a glass transition temperature of at least 30° C.

characterized that the (meth) acrylic polymer (P1) has a mass average molecular weight Mw of less than 100 000 g/mol.

Preferably the step a) is made before step b).

More preferably step b) is performed in presence of the polymer (A1) obtained in step a).

Advantageously the method for manufacturing the polymer composition comprising the (meth) acrylic polymer (P1) and the multi stage polymer is a multistep process and comprises the steps one after the other of
- a) polymerizing by emulsion polymerization of a monomer or monomer mixture ($A_m$) to obtain one layer in stage (A) comprising polymer (A1) having a glass transition temperature of less than 0° C.
- b) polymerizing by emulsion polymerization of a monomer or monomer mixture ($B_m$) to obtain layer in stage (B) comprising a polymer (B1) having a glass transition temperature of at least 30° C.
- c) polymerizing by emulsion polymerization of a monomer or monomer mixture ($P1_m$) to obtain a layer in this additional stage comprising the (meth) acrylic polymer (P1) having a glass transition temperature of at least 30° C.

characterized that the (meth) acrylic polymer (P1) has a mass average molecular weight Mw of less than 100 000 g/mol.

The respective monomers or monomer mixtures ($A_m$), ($B_m$) and ($P1_m$) for forming the layers (A), (B) and additional stage respectively comprising the polymers (A1), (B1) and (P1) respectively, are the same as defined before. The characteristics of the polymers (A1), (B1) and (P1) respectively, are the same as defined before.

Preferably the method for manufacturing the polymer composition comprising the (meth) acrylic polymer (P1) and the multi stage polymer comprises the additional step d) of recovering of this polymer composition.

By recovering is meant partial or separation between the aqueous and solid phase, latter comprises the polymer composition.

More preferably according to the invention the recovering of the polymer composition is made by coagulation or by spray-drying.

Spray drying is the preferred method for the recovering and/or drying for the manufacturing method for a polymer powder composition according to the present invention if the polymer (A1) having a glass transition temperature below 0° C. comprises at least 50 wt % of polymeric units coming from alkyl acrylate and the stage (A) is the most inner layer of the polymer particle having the multilayer structure.

Coagulation is the preferred method for the recovering and/or drying for the manufacturing method for a polymer powder composition according to the present invention if the polymer (A1) having a glass transition temperature below 0° C. comprises at least 50 wt % of polymeric units coming from isoprene or butadiene and the stage (A) is the most inner layer of the polymer particle having the multilayer structure.

The method for manufacturing the polymer composition according to the invention can comprise optionally the additional step e) of drying of the polymer composition.

Preferably the drying step e) is made if the step d) of recovering of the polymer composition is made by coagulation.

Preferably after the drying step an e) the polymer composition comprises less than 3 wt %, more preferably less than 1.5 wt % advantageously less than 1% of humidity or water.

The humidity of a polymer composition can be measure with a thermo balance.

The drying of the polymer can be made in an oven or vacuum oven with heating of the composition for 48 hours at 50° C.

With regard to the process according to the second preferred embodiment for preparing the polymer composition comprising the (meth) acrylic polymer (P1) and the multi stage polymer, it comprises the steps of
    a) mixing of the (meth) acrylic polymer (P1) and the multi stage polymer
    b) recovering the obtained mixture of previous step in form of a polymer powder
wherein the (meth) acrylic polymer (P1) and the multi stage polymer in step a) are in form of a dispersion in aqueous phase.

The quantities of the aqueous dispersion of the (meth) acrylic polymer (P1) and the aqueous dispersion of the multi stage polymer are chosen in a way that the weight ratio of the multi stage polymer based on solid part only in the obtained mixture is at least 5 wt %, preferably at least 10 wt %, more preferably at least 20 wt % and advantageously at least 50 wt %.

The quantities of the aqueous dispersion of the (meth) acrylic polymer (P1) and the aqueous dispersion of the multi stage polymer are chosen in a way that the weight ratio of the multi stage polymer based on solid part only in the obtained mixture is at most 99 wt %, preferably at most 95 wt % and more preferably at most 90 wt %.

The quantities of the aqueous dispersion of the (meth) acrylic polymer (P1) and the aqueous dispersion of the multi stage polymer are chosen in a way that the weight ratio of the multi stage polymer based on solid part only in the obtained mixture is between 5 wt % and 99 wt %, preferably between 10 wt % and 95 wt % and more preferably between 20 wt % and 90 wt %.

The recovering step b) of the process for manufacturing the polymer composition comprising the (meth) acrylic polymer (P1) and the multi stage polymer, is preferably made by coagulation or by spray drying.

The process for manufacturing the polymer composition comprising the (meth) acrylic polymer (P1) and the multi stage polymer can optionally comprise the additional step c) for drying the polymer composition.

By dry is meant that the polymer composition according to the present invention comprises less than 3 wt % humidity and preferably less than 1.5 wt % humidity and more preferably less than 1.2 wt % humidity.

The humidity can be measured by a thermo balance that heats the polymer composition and measures the weight loss.

The process for manufacturing the polymer composition comprising the (meth) acrylic polymer (P1) and the multi stage polymer yields preferably to a polymer powder. The polymer powder of the invention is in form of particles. A polymer powder particle comprises agglomerated primary polymer particles made by multistage process and the (meth) acrylic polymer (P1).

With regard to the polymer powder comprising the (meth) acrylic polymer (P1) and the multi stage polymer according to the two embodiments of the process of preparation, it has a volume median particle size D50 between 1 µm and 500 µm. Preferably the volume median particle size of the polymer powder is between 10 µm and 400 µm, more preferably between 15 µm and 350 µm and advantageously between 20 µm and 300 µm.

The D10 of the particle size distribution in volume is at least 7 µm and preferably 10 µm.

The D90 of the particle size distribution in volume is at most 950 µm and preferably 500 µm, more preferably at most 400 µm.

The weight ratio r of the (meth) acrylic polymer (P1) in relation to the multi stage polymer is at least 5 wt %, more preferably at least 7 wt % and still more preferably at least 10 wt %.

According to the invention the ratio r of the (meth) acrylic polymer (P1) in relation to the multi stage polymer is at most 95 w %.

Preferably the weight ratio of the (meth) acrylic polymer (P1) in relation to the multi stage polymer is between 5 wt % and 95 wt % and preferably between 10 wt % and 90 wt %.

With regard to the monomer (M1) it is a liquid monomer at least in the temperature range between 0° C. and 60° C. The monomer (M1) comprises one carbon C=C double bond.

The monomer (M1) according to the invention is a monomer that is a solvent for the (meth) acrylic polymer (P1). In other word the (meth) acrylic polymer (P1) is soluble in the monomer (M1).

Soluble means that in a certain time the (meth) acrylic polymer (P1) in contact the thermodynamically compatible monomer (M1) is dissolved and a solution of the (meth) acrylic polymer (P1) in the monomer (M1) is obtained.

The solubility of the (meth) acrylic polymer (P1) in the monomer (M1) can be simply tested by mixing under agitation at 25° C. the two compounds. For one skilled in the art the solvents including monomers as monomer (M1) for a large number of polymers are known. On the other hand solubility parameter values are given for a large number of polymer and solvents, latter including a large number of monomers for example in Polymer Handbook (4$^{th}$ edition) Ed. J. Brandrup, E. H. Immergut and E. A. Grulke; Pub.: John Wiley and Sons Inc. 1999, Chapter "Solubility Parameter Value" by Eric A. Gulke VII/675 to VII/714.

The monomer (M1) is preferably chosen from (meth) acrylic monomers and/or vinyl monomers and mixtures thereof. If the monomer (M1) is a mixture of several monomers, the (meth) acrylic polymer (P1) is soluble in the mixture comprising the monomer(s) (M1).

The monomer (M1) is more preferably chosen from C1 to C12 alkyl (meth)acrylates, styrenic monomers and mixtures thereof.

In a first preferred embodiment the monomer (M1) comprises at least 50 wt % of methyl methacrylate.

In a second preferred embodiment the monomer (M1) is a mixture of monomers that comprises at least 50 wt % of methyl methacrylate and the rest up too 100 wt % is chosen from C2 to C12 alkyl (meth)acrylates, alkyl acrylate, styrenic monomers and mixtures thereof.

In a third preferred embodiment the monomer (M1) comprises at least 80 wt % of methyl methacrylate.

In a forth preferred embodiment the monomer (M1) is a mixture of monomers that comprises at least 80 wt % of methyl methacrylate and the rest up too 100 wt % is chosen from C2 to C12 alkyl (meth)acrylates, alkyl acrylate, styrenic monomers and mixtures thereof.

In a fifth preferred embodiment the monomer (M1) comprises at least 90 wt % of methyl methacrylate.

In a sixth preferred embodiment the monomer (M1) is a mixture of monomers that comprises at least 90 wt % of methyl methacrylate and the rest up too 100 wt % is chosen from C2 to C12 alkyl (meth)acrylates, alkyl acrylate, styrenic monomers and mixtures thereof.

In a seventh preferred embodiment the monomer (M1) is methyl methacrylate only.

The liquid composition of the present invention is less viscous than a composition not comprising the (meth)acrylic polymer (P1).

The liquid composition of the present invention can be used to prepare a better dispersed multistage polymer instead of a liquid composition not comprising the (meth) acrylic polymer (P1).

With regard to the process for manufacturing the liquid composition is comprises the steps of
a) preparing a composition comprising a (meth) acrylic polymer (P1) and a multi stage polymer
b) mixing the composition of previous step with a monomer (M1)
wherein the multistage polymer to monomer (M1) ratio by weight in the liquid composition is between 1/99 and 25/75.

Preferably the (meth) acrylic polymer (P1) has a mass average molecular weight Mw of less than 100 000 g/mol. The (meth) acrylic polymer (P1) is the same as defined before.

The composition comprising the (meth) acrylic polymer (P1) and a multi stage polymer can be in form of the polymer powder as obtained by the two preferred embodiments of preparation.

The process yields to a liquid composition that is less viscous than a composition not comprising the (meth)acrylic polymer (P1).

The process yields to a liquid composition that possesses a better dispersion of the multistage polymer than a composition not comprising the (meth)acrylic polymer (P1).

The agglomerated polymer powder is better dispersed in the solvent when the (meth)acrylic polymer (P1) is present.

The process of the invention for manufacturing the liquid composition can be used to prepare a better dispersed multistage polymer than a composition not comprising the (meth)acrylic polymer (P1).

An additional aspect of the invention is that the liquid composition comprising
a) a (meth)acrylic polymer (P1),
b) a multi stage polymer and
c) a monomer (M1)
wherein the multistage polymer to monomer (M1) ratio by weight in the liquid composition is between 1/99 and 25/75, can be used to prepare a better dispersion of the multistage polymer in the monomer (M1) than a composition not comprising the (meth)acrylic polymer (P1).

Another additional aspect of the invention is that the liquid composition comprising
a) a (meth)acrylic polymer (P1),
b) a multi stage polymer and
c) a monomer (M1)
wherein the multistage polymer to monomer ratio by weight in the liquid composition is between 1/99 and 25/75, can be used for the preparation of the impact modified polymers, by polymerizing the monomer (M1).

The liquid composition according to the invention can also be mixed with other monomers and polymers that are not part of the composition before polymerization of monomer (M1). The liquid composition according to the invention can be used as a liquid masterbatch.

The multistage polymer is better distributed in the polymer matrix after polymerization than using a composition not comprising the (meth)acrylic polymer (P1).

[Methods of Evaluation]

Viscosity Measurements

The viscosity is measured with a MCR 301 rheometer from Anton Paar. Couette geometry is used. Temperature is 25° C. and with a shear rate from 0.1 s-1 to 100 s-1.

Glass Transition Temperature

The glass transitions (Tg) of the polymers are measured with equipment able to realize a thermo mechanical analysis. A RDAII "RHEOMETRICS DYNAMIC ANALYSER" proposed by the Rheometrics Company has been used. The thermo mechanical analysis measures precisely the visco-elastics changes of a sample in function of the temperature, the strain or the deformation applied. The apparatus records continuously, the sample deformation, keeping the stain fixed, during a controlled program of temperature variation. The results are obtained by drawing, in function of the temperature, the elastic modulus (G'), the loss modulus and the tan delta. The Tg is higher temperature value read in the tan delta curve, when the derived of tan delta is equal to zero.

Molecular Weight

The mass average molecular weight (Mw) of the polymers is measured with by size exclusion chromatography (SEC).

Particle Size Analysis

The particle size of the primary particles after the multistage polymerization is measured with a Zetasizer.

The particle size of the polymer powder after recovering is measured with Malvern Mastersizer 3000 from MALVERN. For the estimation of weight average powder particle size, particle size distribution and ratio of fine particles a Malvern Mastersizer 3000 apparatus with a 300 mm lenses, measuring a range from 0.5-880 µm is used.

EXAMPLES

Synthesis of multistage polymer (core-shell particles) is made according to the example of sample 1 of WO2012/

038441 in order to obtain a multistage polymer. The multistage polymer CS1 is obtained. It comprises a stage (A) comprising a polymer (A1) having a glass transition temperature of less than 0° (essentially made of butyl acrylate) and a stage (B) comprising a polymer (B1) having a glass transition temperature of at least 30° C. (essentially made of methyl methacrylate). The multistage polymer CS1 is kept as an aqueous dispersion for further use.

Synthesis of a (meth)acrylic polymer type (P1) is made according to two embodiments: first the (meth) acrylic polymer (P1) is polymerized in the presence of the multistage polymer CS1. The (meth) acrylic polymer (P1) is made as an additional stage of the multistage polymer CS. And in a second embodiment the (meth) acrylic polymer (P1) is polymerized apart and mixed or blended with the multistage polymer after the end of polymerization of the (meth) acrylic polymer (P1).

Comparative Example 1

The multistage polymer CS1 is mixed with methyl methacrylate (MMA) at 20° C. under agitation so that 15 wt % of CS1 are in the liquid composition relatively to the MMA.

Example 1

The (meth) acrylic polymer (P1) is made as an additional stage on the multistage polymer CS1. A semi continuous process is used: charged into a reactor, with stirring, were 6 400 g of multi stage polymer (CS1) in de-ionized water, 0.01 g of FeSO4 and 0.032 g of ethylenediaminetetraacetic acid, sodium salt (dissolved in 10 g of de-ionized water), 3.15 g of sodium formaldehydesulfoxylate dissolved if 110 g of de-ionized water and 21.33 g of emulsifier potassium salt of beef tallow fatty acid (dissolved in 139.44 g of water), and the mixture was stirred until complete dissolution of added raw materials except core-shell polymer. Three vacuum-nitrogen purges were carried out in succession and the reactor left under a slight vacuum. The reactor was then heated. At the same time, a mixture comprising 960.03 g of methyl methacrylate, 106.67 g of dimethylacrylamide and 10.67 g of n-octyl mercaptan was nitrogen-degassed for 30 minutes. The reactor is heated at 63° C. and maintained at that temperature. Next, the monomers mixture was introduced into the reactor in 180 min using a pump. In parallel, a solution of 5.33 g of ter-butyl hydroperoxide (dissolved in 100 g of de-ionized water) is introduced (same addition time). The lines was rinsed with 50 g and 20 g of water. Then the reaction mixture was heated at a temperature of 80° C. and the polymerization was then left to completion for 60 minutes after the end of the monomers addition. The reactor was cooled down to 30° C. The mass average molecular weight of the (meth)arylic polymer P1 is $M_w$=28 000 g/mol.

The final polymer composition was then recovered, the polymer composition being dried by spray drying. The obtained polymer composition is mixed with methyl methacrylate (MMA) at 20° C. under agitation so that 15 wt % of CS1 relatively to MMA are in the liquid composition comprising MMA, (meth)arylic polymer (P1) and multi-stage polymer CS1.

Example 2 the (meth) acrylic polymer (P1) is polymerized apart and mixed or blended with the multistage polymer CS1. Synthesis of the (meth) acrylic polymer (P1): semi continuous process: charged into a reactor, with stirring, were 1700 g of de-ionized water, 0.01 g of FeSO4 and 0.032 g of ethylenediaminetetraacetic acid, sodium salt (dissolved in 10 g of de-ionized water), 3.15 g of sodium formaldehydesulfoxylate dissolved if 110 g of de-ionized water and 21.33 g of emulsifier potassium salt of beef tallow fatty acid (dissolved in 139.44 g of water), and the mixture was stirred until complete dissolution. Three vacuum-nitrogen purges were carried out in succession and the reactor left under a slight vacuum. The reactor was then heated. At the same time, a mixture comprising 960.03 g of methyl methacrylate, 106.67 g of dimethylacrylamide and 10.67 g of n-octyl mercaptan was nitrogen-degassed for 30 minutes. The reactor is heated at 63° C. and maintained at that temperature. Next, the monomers mixture was introduced into the reactor in 180 min using a pump. In parallel, a solution of 5.33 g of ter-butyl hydroperoxide (dissolved in 100 g of de-ionized water) is introduced (same addition time). The lines was rinsed with 50 g and 20 g of water. Then the reaction mixture was heated at a temperature of 80° C. and the polymerization was then left to completion for 60 minutes after the end of the monomers addition. The reactor was cooled down to 30° C. The obtained solid content is 34.2%. The mass average molecular weight of the (meth)arylic polymer P1 is $M_w$:=28 000 g/mol.

The aqueous dispersion of the multistage polymer CS1 and the (meth) acrylic polymer (P1) are mixed in quantities that the weight ratio based on solid polymer between the (meth) acrylic polymer (P1) and the multistage polymer CS1 is 15/85. The mixture was recuperated as a power by spray drying.

The obtained mixture of is mixed with methyl methacrylate at 20° C. under agitation so that 15 wt % of CS1 relatively to MMA are in the liquid composition comprising MMA, (meth)arylic polymer (P1) and multistage polymer CS1.

Example 3 example 2 is repeated but the weight ratio based on solid polymer between the (meth) acrylic polymer (P1) and the multistage polymer CS1 is 25/75.

The viscosity of the respective liquid compositions is measured.

TABLE 1 viscosity results of liquid compositions

| Example | Sample | Viscosity [Pa * s] at 1 $s^{-1}$ | Solid content of polymers (CS1 + P1) in composition [wt %] | Solid content CS1 in composition [wt %] |
|---|---|---|---|---|
| Comparative example 1 | Liquid composition of MMA with 15 wt % CS1 | 139 | 15 | 15 |
| Example 1 | Liquid composition of MMA from CS1 and additional shell polymer P1 | 41 | 16.87 | 15 |
| Example 2 | Liquid composition of MMA from blend of P1 and CS1 15/85 wt ratio | 20 | 17.64 | 15 |

TABLE 1-continued viscosity results of liquid compositions

| Example | Sample | Viscosity [Pa * s] at 1 s$^{-1}$ | Solid content of polymers (CS1 + P1) in composition [wt %] | Solid content CS1 in composition [wt %] |
|---|---|---|---|---|
| Example 3 | Liquid composition of MMA from blend of P1 and CS1 at 25/75 wt ratio | 15 | 20 | 15 |

As shown in table 1 the global solid content of polymer increases while the ratio of the multistage polymer stays constant at 15 wt % relatively to the monomer M1=MMA, but the dynamic viscosity of the composition decreases.

The core shell particles are more efficiently dispersed having a lower effective volume in the liquid composition, when the methacrylic polymer (P1) is present.

The invention claimed is:

1. A process for manufacturing a liquid composition comprising the steps of:
    a) preparing a composition comprising a (meth) acrylic polymer (P1) having a mass average molecular weight Mw of less than 100,000 g/mol and a multi stage polymer, said multistage polymer being in the form of core shell particles having a multilayer structure comprising at least one layer (A) comprising a polymer (A1) having a glass transition temperature below 0° C. and another layer (B) comprising a polymer (B1) having a glass transition temperature over 30° C., said layer (A) being made in the first stage of a multistage process and forming the core for the polymer particle having the multilayer structure, and
    b) mixing the composition of previous step with a monomer (M1),
    wherein the multistage polymer to monomer (M1) ratio in the liquid composition is between 1/99 and 25/75, such that the multistage polymer is homogenously dispersed in said liquid composition.

2. The process according to claim 1, wherein the (meth) acrylic polymer (P1) has a mass average molecular weight Mw between 5,000 g/mol and 70,000 g/mol.

3. The process according to claim 1, wherein the (meth) acrylic polymer (P1) has a mass average molecular weight Mw between 6,000 g/mol and 50,000 g/mol.

4. The process according to claim 1 wherein that (meth) acrylic polymer (P1) is not crosslinked or not grafted on any other polymer or polymers.

5. The process according to claim 1 wherein (meth) acrylic polymer (P1) is polymerized apart and mixed or blended with the multistage polymer.

* * * * *